US010931989B2

(12) United States Patent
Ghangam et al.

(10) Patent No.: US 10,931,989 B2
(45) Date of Patent: Feb. 23, 2021

(54) MULTI-OUTPUT SYNCHRONIZATION

(71) Applicant: INTEL CORPORATION, Santa Clara, CA (US)

(72) Inventors: Sangeeta Ghangam, Chandler, AZ (US); Kevin Stanton, Hillsboro, OR (US); Eric Auzas, Scottsdale, AZ (US); Christopher Hall, Portland, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/829,612

(22) Filed: Dec. 1, 2017

(65) Prior Publication Data

US 2019/0045246 A1    Feb. 7, 2019

(51) Int. Cl.
| H04N 21/24 | (2011.01) |
| H04N 21/242 | (2011.01) |
| H04L 7/00 | (2006.01) |
| H04N 5/04 | (2006.01) |
| H04J 3/06 | (2006.01) |
| H04N 21/43 | (2011.01) |
| H04N 21/6332 | (2011.01) |

(52) U.S. Cl.
CPC ......... *H04N 21/242* (2013.01); *H04J 3/0697* (2013.01); *H04L 7/0012* (2013.01); *H04N 5/04* (2013.01); *H04N 21/4307* (2013.01); *H04N 21/6332* (2013.01)

(58) Field of Classification Search
None
See application file for complete search history.

(56) References Cited

U.S. PATENT DOCUMENTS

| 7,246,367 | B2 * | 7/2007 | Iivonen | H04N 7/165 348/E7.063 |
| 2006/0280182 | A1 * | 12/2006 | Williams | H04L 7/0025 370/394 |
| 2010/0135334 | A1 * | 6/2010 | Briscoe | H04N 21/242 370/503 |
| 2013/0166898 | A1 * | 6/2013 | Diab | G06F 1/3206 713/100 |
| 2018/0184138 | A1 * | 6/2018 | Shaw | H04N 21/25866 |
| 2018/0310042 | A1 * | 10/2018 | Mayalil | H04N 21/242 |

\* cited by examiner

*Primary Examiner* — Cai Y Chen
(74) *Attorney, Agent, or Firm* — Schwegman Lundberg & Woessner, P.A.

(57) ABSTRACT

Systems and methods of generating a synchronized media content presentation using a plurality of media output systems communicably coupled to a respective plurality of network connected platforms are provided. A first network connected platform receives an IEEE 802.1AS master timing signal generated by "Grand Master" timing circuitry disposed in a second network connected platform. IEEE 802.1AS application service circuitry disposed in the first network connected platform determines an offset between a local timing signal and the receive master timing signal. Talker circuitry disposed in the first network connected platform synchronizes a media content presentation to the master timing signal and communicates a media/master timing signal synchronization signal to each of the network connected platforms. The media/master timing signal synchronization signal includes data representative of a media start location and a media start time referenced to the master timing signal.

16 Claims, 7 Drawing Sheets

MULTI-OUTPUT SYNCHRONIZATION

TECHNICAL FIELD

The present disclosure relates to synchronized output across multiple platforms.

BACKGROUND

Synchronized media output across a number of platforms may be used to provide output presentations such as video walls in which one or more output devices coupled to each of the platforms are used to display a portion of the media content. Other synchronized media presentations include media barrages in which one or more output devices coupled to each of a number of platforms each provide a synchronized media output. Synchronization of the platforms used to generate the media content output is essential in these applications because a lack of synchronization of even a single platform is readily perceived by a human observer.

Generator locking or "genlock" is a functionality used in digital signage application to synchronize a video output across multiple output devices in a "video wall" format. Most current solutions use discrete graphics combined with a central processing unit (CPU) to achieve the synchronization of a media content presentation. However, the discrete video cards used to implement such video walls are costly and costs for even a fairly small video wall containing relatively few monitors may rapidly escalate into the thousands or even tens of thousands of dollars.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
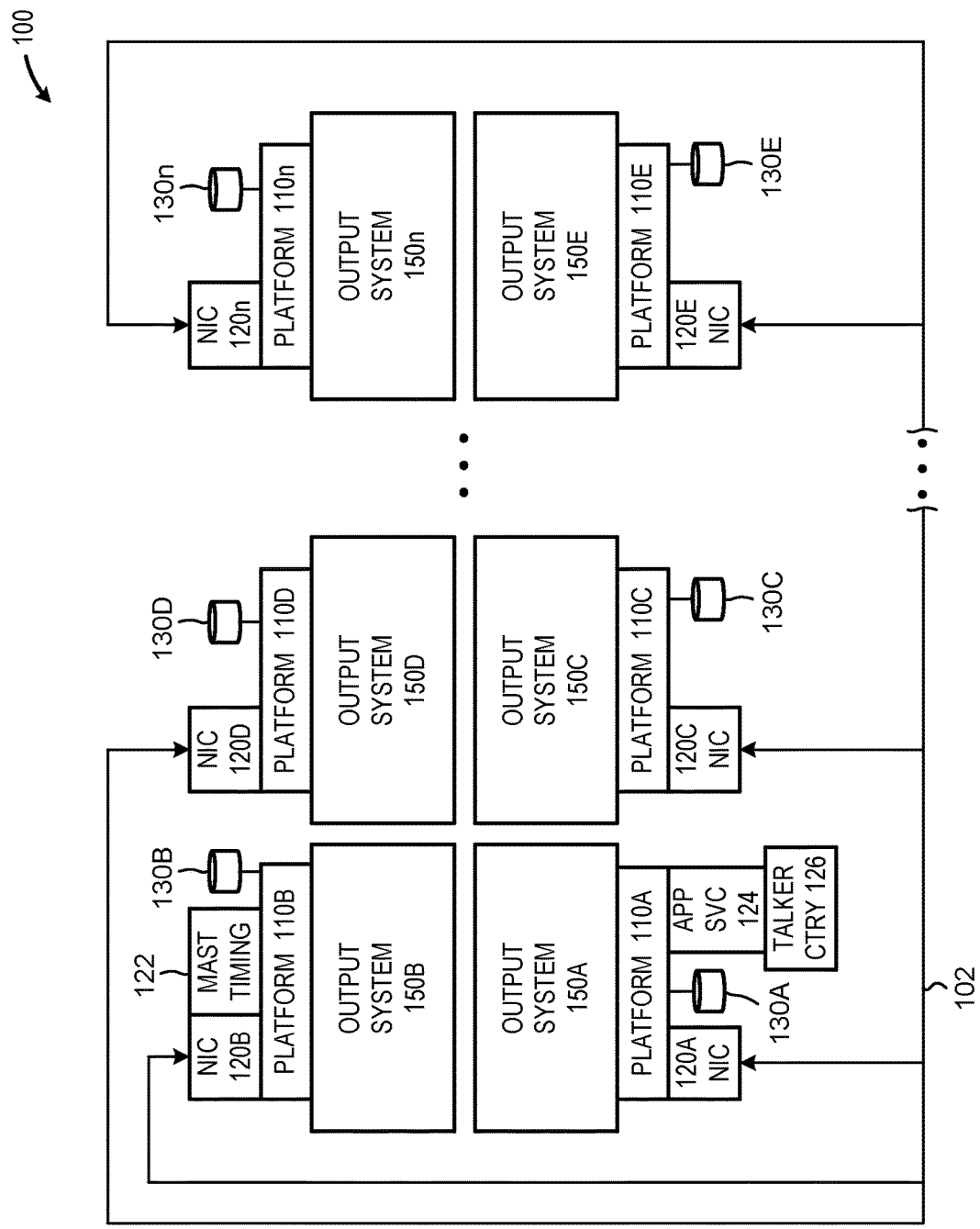
FIG. 1 is a schematic of an illustrative system that includes a plurality of platforms communicably coupled via a network, the plurality of platforms to provide a synchronized media presentation using each of a respective plurality of media output systems, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods described herein beneficially and advantageously synchronize the output generated by a network that includes a plurality of platforms by synchronizing each of the plurality of platforms to a timing signal provided by one of the plurality of platforms (the "master clock") and in which an application service executed by one of the plurality of platforms (the "media content master") synchronizes the output generated by each of the plurality of platforms to the timing signal. Additionally, the systems and methods disclosed herein enable the autonomous synchronization of each of the plurality of platforms to the timing signal and the autonomous generation of synchronized output by initiating output using the media content master.

Each of the plurality of platforms may be operably coupled to an output system that includes one or more output devices. In embodiments, the output devices may include display devices such as video monitors disposed in an array forming a "video wall" or similar structure. In embodiments, the output devices may include display devices such as monitors or display panels disposed on vending machines, buildings, kiosks or the like. Thus, the plurality of platforms may be operably coupled to any number of output devices. In embodiments, the content presented by each of the output devices may be identical (e.g., a synchronized video output on each output device). In embodiments, the content presented by each of the output devices may be different and may form a smaller portion of a larger scene (e.g., a synchronized video output across some or all of the output devices. The master clock provides a timing signal to each of the plurality of platforms connected to the network. The media content master uses the timing signal provided by the master clock to communicate the desired frame render times (e.g., display frame "X" of file "Y" at time "Z") to the network-connected platforms.

In embodiments, one of a plurality of network connected platforms is selected as a master timekeeper (e.g., an IEEE 802.1AS "Grand Master") to which the remaining network connected platforms synchronize their respective media presentations. Each of the plurality of network connected platforms may synchronize their respective media presentations with a local timekeeper using hardware or software (e.g., IEEE 802.1AS service) to determine a local offset to the master timing signal. In embodiments, a high speed bridge may be used to communicably couple the platforms together. One of the network connected platforms may function as a media content master that manages the media output "playlist" and synchronizes the media presentation across the plurality of network connected platforms. Any number of network connected platforms and/or media output devices may be operably coupled to the network to provide a synchronized media content presentation.

In embodiments, the plurality of platforms may conduct a negotiation process using a standardized protocol to select a platform that will function as a master timekeeper (e.g., an IEEE 802.1AS compliant "Grand Master") that distributes a reference time to each of the network connected platforms. Each network connected platform determines an offset between the platform timekeeper and the reference time distributed by the Grand Master. A network connected platform functions as a "Media Clock Master" (MCM). The MCM manages the media presentation across the network connected platforms by communicating a desired frame render rate (i.e., render frame X of file Y at master time Z) to each of the network connected platforms.

A synchronized media delivery system is provided. The system may include: a network communicably coupling each of a plurality of platforms to each of the other platforms included in the plurality of platforms; and a plurality of platforms, each of the platforms operably coupled to an output system and each of the plurality of platforms including a network interface that includes timing circuitry; wherein the network interface included in at least one platform includes master timing circuitry that generates a master timing signal and communicates the master timing signal to each of the other platforms included in the plurality of platforms; and wherein the network interface included in at least one platform includes application service circuitry that generates an output synchronization signal and communicates the output synchronization signal to each of the other platforms included in the plurality of platforms.

A synchronized media delivery method is provided. The method may include: receiving a master timing signal at a first network connected platform included in a plurality of network connected platforms; determining, by application service circuitry disposed in the first network connected platform included in the plurality of network connected platforms, an offset between a local timekeeper and the received master timing signal; synchronizing, by talker circuitry disposed in the first network connected platform included in the plurality of network connected platforms, a media content presentation with the master timing signal; generating, by the talker circuitry, a media/master timing synchronization signal that includes information indicative of the synchronization between the media content presentation and the master timing signal; and communicating, by the talker circuitry, the media/master timing synchronization signal to each of at least a portion of the plurality of network connected platforms.

A synchronized media delivery system is provided. The system may include: means for receiving a master timing signal at a first network connected platform included in a plurality of network connected platforms; means for determining an offset between a local timekeeper and the received master timing signal; means for synchronizing a media content presentation with the master timing signal; means for generating a media/master timing synchronization signal that includes information indicative of the synchronization between the media content presentation and the master timing signal; and means for communicating the media/master timing synchronization signal to each of at least some network connected platforms included in the plurality of network connected platforms.

A non-transitory machine-readable storage medium is provided. The non-transitory machine-readable storage medium may include instructions that when executed by processor circuitry, causes the processor circuitry to: receive a master timing signal; determine an offset between a local timekeeper and the received master timing signal; synchro- nize a media content presentation with the master timing signal; generate a media/master timing synchronization signal that includes information indicative of the synchronization between the media content presentation and the master timing signal; and communicate the media/master timing synchronization signal to each of at least a portion of a plurality of network connected platforms.

As used herein the terms "top," "bottom," "upper," "lower," "lowermost," and "uppermost" when used in relationship to one or more elements are intended to convey a relative rather than absolute physical configuration. Thus, an element described as an "upper film layer" or a "top element" in a device may instead form the "lowermost element" or "bottom element" in the device when the device is inverted. Similarly, an element described as the "lowermost element" or "bottom element" in the device may instead form the "uppermost element" or "top element" in the device when the device is inverted.

As used herein, the term "logically associated" when used in reference to a number of objects, systems, or elements, is intended to convey the existence of a relationship between the objects, systems, or elements such that access to one object, system, or element exposes the remaining objects, systems, or elements having a "logical association" with or to the accessed object, system, or element. An example "logical association" exists between relational databases where access to an element in a first database may provide information and/or data from one or more elements in a number of additional databases, each having an identified relationship to the accessed element. In another example, if "A" is logically associated with "B," accessing "A" will expose or otherwise draw information and/or data from "B," and vice-versa.

FIG. 1 is a schematic of an illustrative system 100 that includes a plurality of network connected platforms 110A-110n (collectively, "network connected platforms 110") communicably coupled via a network 102, the plurality of platforms 110 to provide a synchronized media presentation using each of a respective plurality of media output systems 150A-150n (collectively, "output systems 150"), in accordance with at least one embodiment described herein. As depicted in FIG. 1, one of the platforms may include master timing circuitry 122. The master timing circuitry 122 generates a master timing signal used by the network connected platforms 110 to synchronize a media presentation. For example, each of the platforms 110 may execute an IEEE 802.1AS compliant application service. Platform 110B may be configured to include master timing circuitry 122 to provide the IEEE 802.1AS "Grand Master." The master timing circuitry 122 provides a master timing signal to some or all of the network connected platforms 110. In embodiments, the plurality of network connected platforms 110 may be communicably coupled to and/or through one or more IEEE 802.1AS compliant network switches.

In embodiments, platform 110A may be configured to include application service circuitry 124. The application service circuitry 124 generates a media synchronization signal and communicates the media synchronization signal to at least some of the network connected platforms 110. The media synchronization signal provides each of the platforms 110 with an instruction to initialize and produce a specific output at a specific master time. For example, the media synchronization signal may cause each of the platforms 110 to begin a synchronized video media presentation by instructing each platform to begin at frame "X" of file "Y" at master time "Z." Beneficially, such synchronization may be achieved using an 802.1AS application service executed locally in each of the platforms 110A-110n.

Each of the platforms 110A-110n includes a respective network interface 120A-120n (collectively, "network interfaces 120"). The network interface 120 may include a wired network interface, a wireless network interface, or any combination thereof. In embodiments, the network interface may include an IEEE 802.3 ("Ethernet") compliant interface. In embodiments, each of the platforms 110 executes an IEEE 802.1AS application service that synchronizes the local platform timekeeper with the IEEE 802.1AS master timing signal provided by the grand master.

At least one of the platforms 110 includes application service circuitry 124. The application service circuitry 124 synchronizes media content with the master timing signal provided by the master timing circuitry 122. In embodiments, the application service circuitry 124 may be disposed, in whole or in part, within a central processing unit (CPU) disposed in the platform 110. In embodiments, all or a portion of the application service circuitry 124 may be disposed remote from the platform 110, for example as a Web or cloud based server. In embodiments, all or a portion of the application service circuitry 124 may be disposed in one or more peripheral devices coupled to the platform 110, such as the network interface 120.

At least one of the platforms 110 includes talker circuitry 126 that communicates a signal containing media content/master timing signal synchronization information to at least some of the platforms 110 coupled to the network 102. In embodiments, the talker circuitry 126 may be disposed, in whole or in part, within a central processing unit (CPU) disposed in the platform 110. In embodiments, all or a portion of the talker circuitry 126 may be disposed remote from the platform 110, for example as a Web or cloud based server. In embodiments, all or a portion of the talker circuitry 126 may be disposed in one or more peripheral devices coupled to the platform 110, such as the network interface 120. In embodiments, the application service circuitry 122 and the talker circuitry 124 may be physically collocated in the same platform 110.

Each of the platforms 110A-110n may also include one or more local storage devices 130A-130n (collectively, "storage devices 130"). The storage devices 130 may store one or more media files for presentation by the platform 110. In embodiments, the storage devices 130 may include, but are not limited to, any currently available or future developed data storage device, such as a solid-state drive (SSD); a hard disk drive (HDD); an electro-resistive storage device; a quantum storage device; an optical storage device; or a molecular storage device. In some implementations, some or all of the platforms 110 may be communicably coupled to one or more remote storage devices, such as one or more cloud-based storage devices.

The media output systems 150 may include one or more devices capable of providing a human-perceptible output. The media output systems 150 may include any number and/or combination of currently available and/or future developed media presentation technology, systems, and/or devices. Example media output systems 150 may include, but are not limited to, one or more visual output devices, one or more audio output devices, one or more tactile output devices, or combinations thereof. In embodiments, each of the platforms 110 may include a communicably coupled media output system 150 equipped with a plurality of display monitors. Example display monitors include, but are not limited to, liquid crystal displays, light emitting diode displays, organic light emitting diode displays, plasma displays, cathode ray tube displays, or combinations thereof.

In an embodiment, the plurality of network connected platforms may be implemented as an Internet of Things (IoT). The Internet of Things is a concept in which a large number of computing devices are interconnected to each other and to the Internet to provide functionality and data acquisition at very low levels. Thus, as used herein, an IoT device may include a semiautonomous device performing a function, such as control, synchronization, and/or generation of an output, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements.

Figure 2:
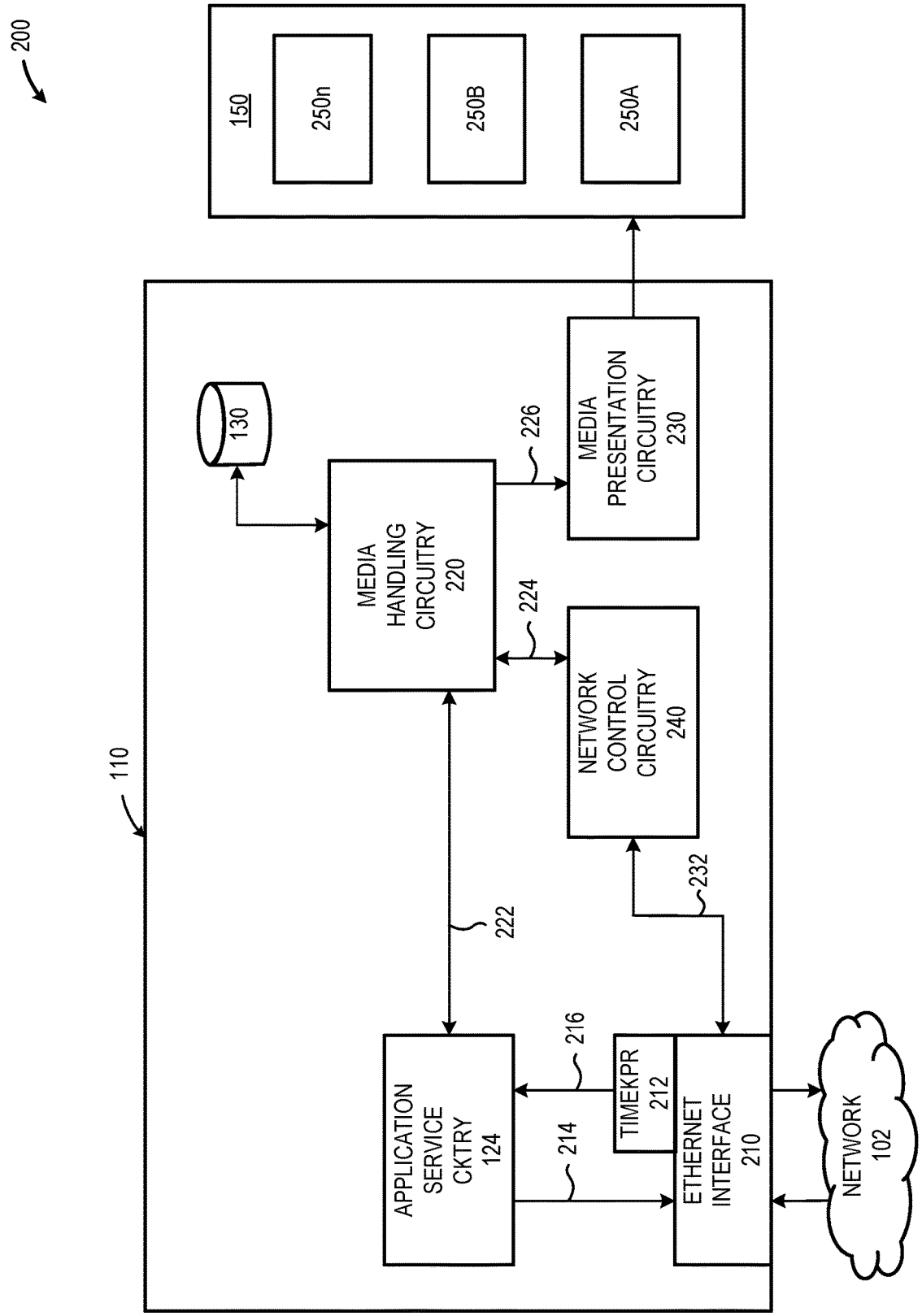
FIG. 2 is a schematic diagram of an illustrative platform that depicts the interaction between application service circuitry and various media handling sub-systems included in each of the plurality of network connected platforms, in accordance with at least one embodiment described herein.

FIG. 2 is a schematic diagram of an illustrative platform 110 that depicts the interaction between application service circuitry 124 and various media handling sub-systems included in each of the plurality of network connected platforms 110A-110n, in accordance with at least one embodiment described herein. As depicted in FIG. 2, the application service circuitry 124 may provide IEEE 802.1AS application service functionality for each of the plurality of network connected platforms 110A-110n. In embodiments, the application service circuitry 124 receives local timing information 216 from local Ethernet timekeeper circuitry 212. In addition, the application service circuitry may also bidirectionally communicate the 802.1AS frames 214 to/from the network 102 via the Ethernet interface 210. In embodiments, the application service circuitry 124 determines an offset between a local (i.e., platform) time provided by the Ethernet timekeeper circuitry 212 and the master time provided by the master timing circuitry 122 (e.g., the precision time protocol or PTP time). In embodiments, the offset associated with the platform 110 containing the master timing circuitry 124 (e.g., the "Grand Master") will be zero, for the remaining network connected platforms 110, the offset may be zero or may be a finite positive or negative value.

In embodiments, the each network connected platform 110 receives, via network 102, one or more signals containing media content/master timing signal synchronization information from talker circuitry 126. The information contained in the signal received from the talker circuitry 126 may identify some or all of: a particular media source (e.g., a media file identifier); a particular start point in the media source (e.g., a particular frame identifier in the media presentation); and a designated master start time (e.g., a PTP time) for presentation of the media by the platform 110.

In embodiments, in each platform 110, the media handling circuitry 220 receives master timing information 222 from the application service circuitry 124 and causes the media presentation circuitry 230 to provide the identified media content at the identified master time to the communicably coupled media output system 150. In embodiments, the media output system 150 may include a plurality of display devices 250A-250n (collectively "display devices 250"). The network control circuitry 240 may send, receive or otherwise exchange information packets 232 over network 102 via the Ethernet interface 210. The network control circuitry 240 may also exchange control information 224 with the media handling circuitry 220.

The application service circuitry 124 in platform 110 receives master timing information and determines a local time difference or offset between a time provided by the Ethernet timekeeper circuitry 212 and the master time (i.e., the IEEE 802.1AS PTP time). The application service circuitry 124 may further receive, from talker circuitry 126 disposed in another of the plurality of network connected platforms 110, one or more signals containing media content/master timing synchronization information. Using the received synchronization information, the network control circuitry 240 causes the media handling circuitry 220 to retrieve media content and provide the media content to the media presentation circuitry 230 at the appropriate master time as received from the application service circuitry 124. In embodiments, the media handling circuitry 220 may retrieve the media content from a local storage device 130, such as a hard disk drive or solid state drive. In other embodiments, the media handling circuitry 220 may retrieve the media content from a remote storage device, such as a cloud storage server or similar, via the network 102 and Ethernet interface 210.

Figure 3:
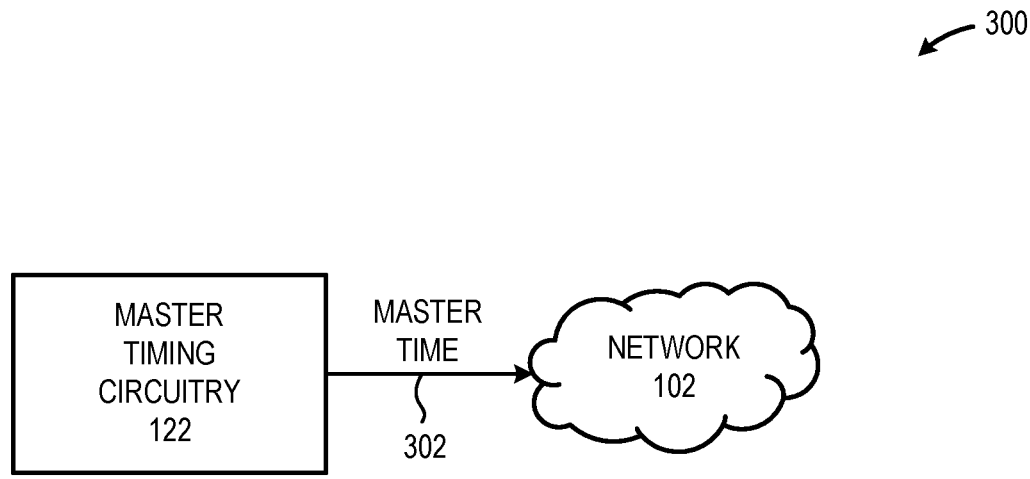
FIG. 3 is an input/output (I/O) diagram depicting illustrative master timing circuitry, in accordance with at least one embodiment described herein.

FIG. 3 is an input/output (I/O) diagram depicting illustrative master timing circuitry 122, in accordance with at least one embodiment described herein. The master timing circuitry 122 generates and multicasts an output signal 302 that includes information and/or data representative of a master time that is communicated to each of at least some of the network connected platforms 110. In embodiments, the master timing circuitry 122 may generate an output signal 302 that includes an IEEE 802.1AS compliant timing signal including a precision timing protocol (PTP) time. In embodiments, any one of the plurality of network connected platforms 110 may provide the master timing circuitry 122. In embodiments, only one of the plurality of network connected platforms 110 may provide a master timing signal 302 generated by the master timing circuitry 122 at any one time.

Figure 4:
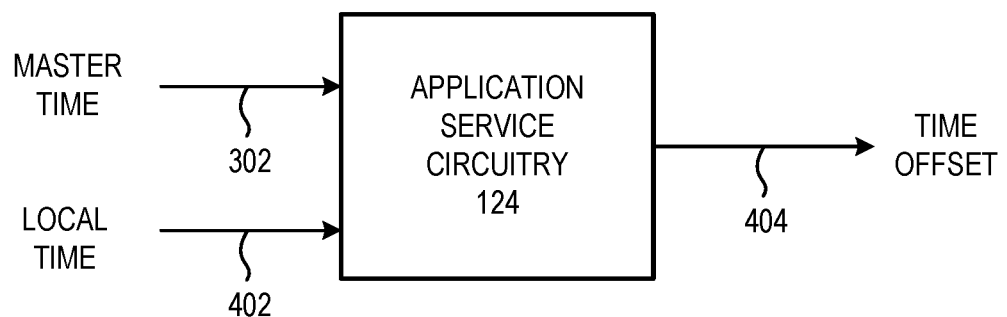
FIG. 4 is an input/output (I/O) diagram depicting illustrative application service circuitry, in accordance with at least one embodiment described herein.

The master timing circuitry 122 may include any number and/or combination of currently available and/or future developed electronic components, semiconductor devices, and/or logic elements sufficient to provide a timing signal to each of the plurality of network connected platforms 110. In embodiments, the master timing circuitry 122 may include hardware, software, firmware or any combination thereof. In some embodiments, the master timing circuitry 122 may be implemented as a portion of a processor or controller. In embodiments, the master timing circuitry 122 may be implemented as a stand along circuit or device. In some implementations FIG. 4 is an input/output (I/O) diagram depicting illustrative application service circuitry 124, in accordance with at least one embodiment described herein. The application service circuitry 124 receives a local timing signal 402 that includes information and/or data indicative of a local or platform time. In embodiments the local timing signal 402 may be generated by one or more timekeeping circuits disposed in, on, or about the platform 110. For example, the local timing signal 402 may be generated by a circuit, timer, timekeeper, or clock circuit disposed in, on, or, about the Ethernet interface 210. In another example, the local timing signal 402 may be generated by a circuit, timer, timekeeper, or clock disposed and/or operably coupled to the platform central processing unit (CPU). The application service circuitry 124 also receives the master timing signal 302 generated by the master timing circuitry 122.

The application service circuitry 124 includes any number and/or combination of static and/or reconfigurable electronic components, semiconductor devices, or logic elements arranged and/or coupled in a manner that determines an offset or differential between the local timing signal 402 and the master timing signal 302. Each of the plurality of network connected platforms 110 includes application service circuitry that determines the offset between the local timing signal 402 generated by the respective platform 110 and the master timing signal 302 provided by the master timing circuitry 122 via the network 102.

The application service circuitry 124 generates a time offset output signal 404 that includes information and/or data indicative of the offset and/or differential between the master timing signal 302 and the local timing signal 402. In embodiments, the time offset output signal may be provided to the media handling circuitry 220. The media handling circuitry 220 may use the offset information to synchronize the media presentation of the respective platform 110 to the received master timing signal 302, beneficially permitting a synchronized media output using the media output systems 150 coupled to at least some of the plurality of network connected platforms 110.

Figure 5:
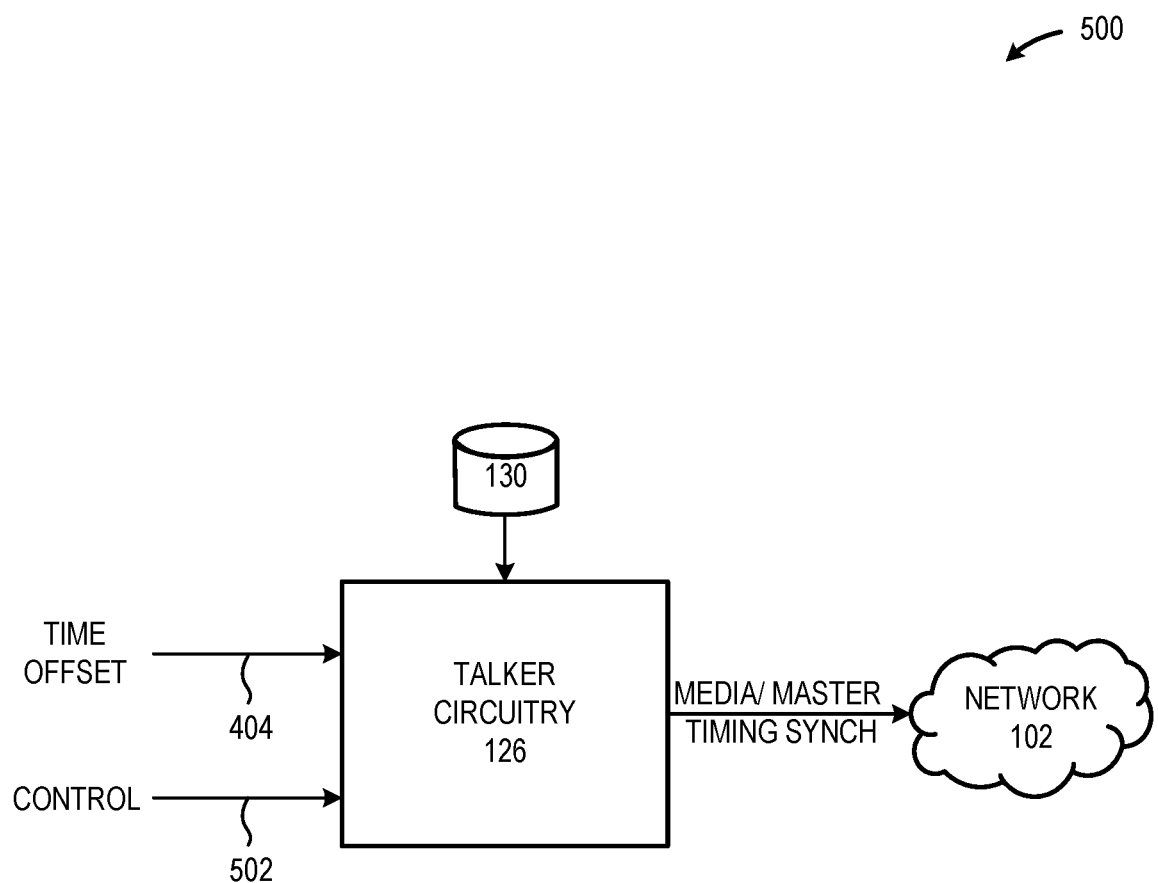
FIG. 5 is an input/output (I/O diagram depicting illustrative talker circuitry, in accordance with at least one embodiment described herein.

FIG. 5 is an input/output (I/O) diagram depicting illustrative talker circuitry 126, in accordance with at least one embodiment described herein. The talker circuitry 126 uses the time offset information contained in the time offset output signal 404 and one or more control signals 502 in conjunction with stored media 504 to generate a media/master timing signal synchronization signal 506. The media/master timing signal synchronization signal 506 includes information and/or data representative of a defined media start location and a defined media start time (referenced to the master time included in the master timing signal) for at least some of the plurality of network connected platforms 110 to commence a synchronized media presentation. In embodiments, the information and/or data included in the media/master timing signal synchronization signal 506 may include a defined location in the media (e.g., a frame of a video file) and a defined start time. The talker circuitry 126 may communicate the media/master timing signal synchronization signal 506 to some or all of the network connected platforms 110 on a one-time basis prior to commencing the media presentation. The talker circuitry 126 may communicate the media/master timing signal synchronization signal 506 to some or all of the network connected platforms 110 on a continuous or intermittent basis during at least a portion of the media presentation to maintain media content output synchronization between the plurality of network connected platforms 110.

The talker circuitry 126 includes any number and/or combination of static and/or reconfigurable electronic components, semiconductor devices, or logic elements arranged and/or coupled in a manner that, upon receipt of control signal 502, synchronizes a media presentation 504 to the master timing signal 302, taking into consideration the offset or differential present between the local platform timing signal 402 and the master timing signal 302. In embodiments, the talker circuitry 126 controls the operation of each of the remaining network connected platforms 110 to ensure the synchronization of a media presentation across all of the network connected platforms 110. In embodiments, a user initiated media presentation on one of the network connected platforms 110 may cause the respective platform 110 to configure talker circuitry 126 which beneficially causes the autonomous and synchronized initiation of the media presentation across all of the network connected platforms 110. Although any of the network connected platforms 110 may include talker circuitry 126, in embodiments, only one of the network connected platforms 110 provides talker circuitry.

The talker circuitry 126 generates a media/master timing signal synchronization signal 506 that includes information and/or data representative of a defined media start location and information and/or data representative of a defined master time to commence the media presentation. Each of the plurality of network connected platforms 110 receives the media/master timing signal synchronization signal 506 and individually queues the media presentation such that at the defined start time, a synchronized media presentation occurs on all of the media output systems 150. In embodiments, the media/master timing signal synchronization signal 506 may be communicated to the remaining network connected platforms 110 via the network 102.

Figure 6:
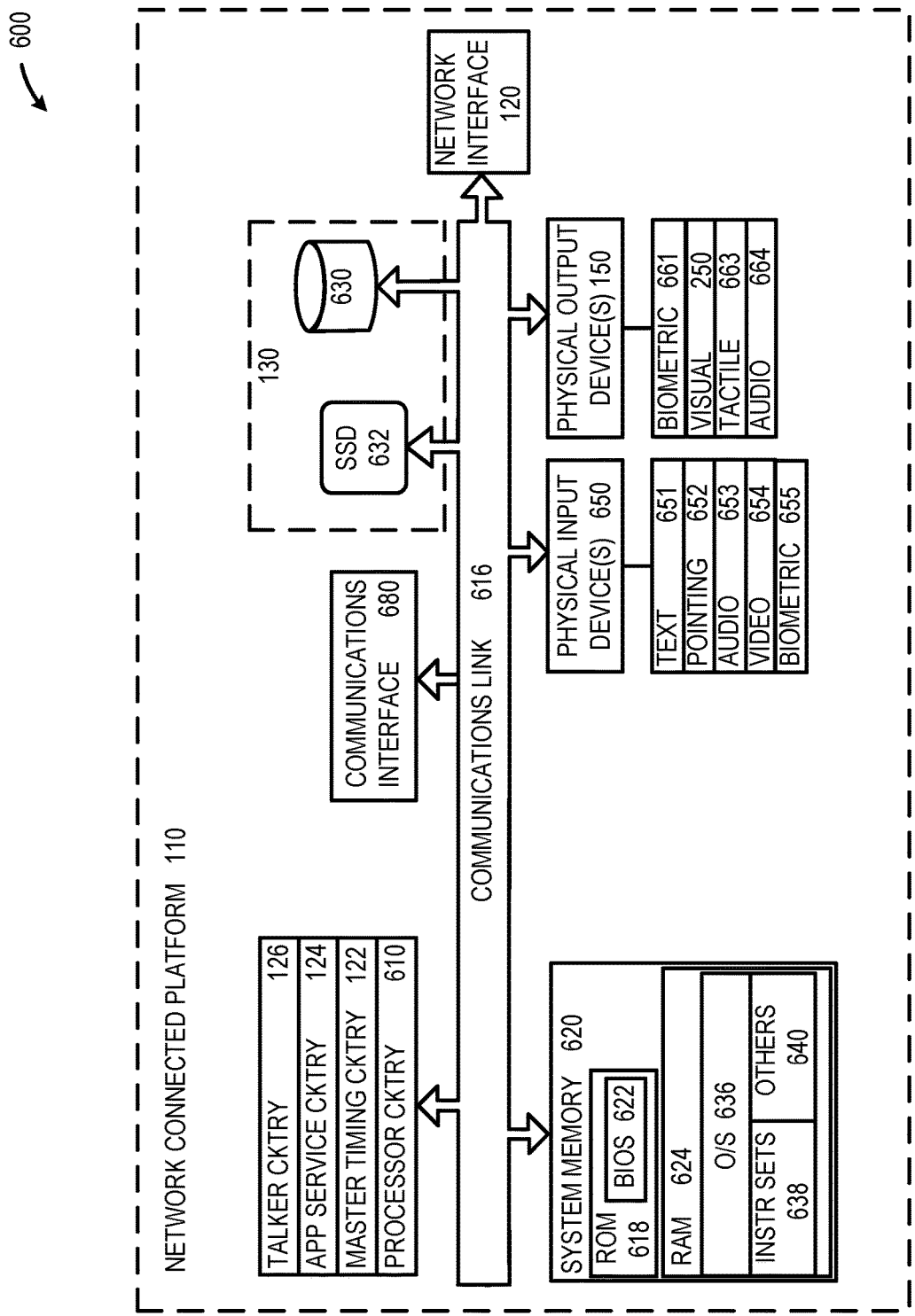
FIG. 6 is a block diagram of an illustrative system that includes a network connected platform equipped with application service circuitry and optionally equipped with master timing circuitry and/or talker circuitry as described in FIGS. 1 through 5 above and in accordance with at least one embodiment described herein.

FIG. 6 is a block diagram of an illustrative system 600 that includes a network connected platform 110 equipped with application service circuitry 124 and optionally equipped with master timing circuitry 122 and/or talker circuitry 126 as described in FIGS. 1 through 5 above and in accordance with at least one embodiment described herein. The following discussion provides a brief, general description of the components forming the illustrative network connected platform 110 such as a workstation, desktop, laptop, thin client, or any similar device having a control circuit 610 and/or a network interface 120 capable of providing at least one of: master timing circuitry 122, application service circuitry 124, and/or talker circuitry 126.

In embodiments, the master timing circuitry 122 generates a master timing signal 302 transmitted to each remaining network connected platform 110. In embodiments, the application service circuitry 124 in each of the plurality of network connected platforms 110 determines an offset or differential between a time signal 402 generated using local (i.e., platform) timing circuitry 212 and the master timing signal 302 provided by the master timing circuitry 122. The talker circuitry 126 generates a media/master timing signal synchronization signal 506 that synchronizes a media presentation with the master timing signal 302. The talker circuitry 126 communicates the media/master timing signal synchronization signal 506 to each of the network connected platforms 110. The application service circuitry 124 in each of the remaining network connected platforms 110 uses the determined offset and/or differential associated with the respective platform 110 to synchronize the media presentation to the master timing signal 302.

The network connected platform 110 includes processor circuitry 610 capable of executing machine-readable instruction sets, reading data from one or more data storage devices 130, such as rotating media storage devices 630 and/or solid-state storage devices 632 and writing data to the one or more data storage devices 130. Those skilled in the relevant art will appreciate that the illustrated embodiments as well as other embodiments can be practiced with other circuit-based device configurations, including portable electronic or handheld electronic devices, portable computers, wearable computers, microprocessor-based or programmable consumer electronics, personal computers ("PCs"), network PCs, minicomputers, mainframe computers, and the like.

The processor circuitry 610 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions. In embodiments, the processor circuitry 610 may provide all or a portion of the master timing circuitry 122, application service circuitry 124, and/or talker circuitry 126. In other embodiments, some or all of the master timing circuitry 122, application service circuitry 124, and/or talker circuitry 126 may be disposed in whole or in part in a separate structure, such as the network interface 210.

The network connected platform 110 includes the processor circuitry 610 and bus or similar communications link 616 that communicably couples and facilitates the exchange of information and/or data between various system components including a system memory 620, one or more rotating media storage devices 630, and/or one or more solid state storage devices 632. The network connected platform 110 may be referred to in the singular herein, but this is not intended to limit the embodiments to a single device and/or system, since in certain embodiments, there will be more than one network connected platform 110 that incorporates, includes, or contains any number of communicably coupled, collocated, or remote networked circuits or devices.

The processor circuitry 610 may include any number, type, or combination of devices, systems, subsystems, modules, or circuitry. The processor circuitry 610 may include any number and/or combination of static or configurable electronic components, semiconductor devices, and/or logic elements. At times, the processor circuitry 610 may be implemented in whole or in part in the form of semiconductor devices such as diodes, transistors, inductors, capacitors, and resistors. Such an implementation may include, but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The communications link 616 that interconnects at least some of the components of the network connected platform 110 may employ any known serial or parallel bus structures or architectures.

The system memory 620 may include read-only memory ("ROM") 618 and random access memory ("RAM") 624. A portion of the ROM 618 may be used to store or otherwise retain a basic input/output system ("BIOS") 622. The BIOS 622 provides basic functionality to the network connected platform 110, for example by causing the processor circuitry 610 to load one or more machine-readable instruction sets. In embodiments, at least some of the one or more machine-readable instruction sets cause at least a portion of the processor circuitry 610 to provide, create, produce, transition, and/or function as a dedicated, specific, and particular machine, for example: the master timing circuitry 122, the application service circuitry 124, and/or the talker circuitry 126.

The network connected platform 110 may include one or more communicably coupled, non-transitory, data storage devices 130, such as one or more rotating media storage devices 630 and/or one or more solid-state storage devices 632. The one or more data storage devices 630 may include any current or future developed storage appliances, networks, and/or devices. Non-limiting examples of such rotating media storage devices 630 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 630 may include one or more removable storage devices, such as one or more flash drives, flash memories, flash storage units, or similar appliances or devices capable of communicable coupling to and decoupling from the network connected platform 110. In embodiments, the one or more rotating media storage devices 630 and the one or more solid-state storage devices 632 may locally store one or more media presentations forming all or a portion of a larger media output array, such as a video wall or similar defined arrangement of output devices.

The one or more rotating media storage devices 630 and/or the one or more solid-state storage devices 632 may include interfaces or controllers (not shown) communicatively coupling the respective storage device or system to the communications link 616. The one or more rotating media storage devices 630 may store, retain, or otherwise contain machine-readable instruction sets, data structures, program modules, data stores, databases, logical structures, and/or other data useful to the processor circuitry 610 and/or one or more applications executed on or by the processor circuitry 610. In some instances, one or more rotating media storage devices 630 may be communicably coupled to the processor circuitry 610, for example via communications link 616 or via one or more wired communications interfaces (e.g., Universal Serial Bus or USB); one or more wireless communications interfaces (e.g., Bluetooth®, Near Field Communication or NFC); one or more wired network interfaces (e.g., IEEE 802.3 or Ethernet); and/or one or more wireless network interfaces (e.g., IEEE 802.11 or WiFi®).

Machine-readable instruction sets 638 and other programs, applications, logic sets, and/or modules 640 may be stored in whole or in part in the system memory 620. Such instruction sets 638 may be transferred, in whole or in part, from the one or more rotating media storage devices 630 and/or the solid state storage device 632. The instruction sets 638 may be loaded, stored, or otherwise retained in system memory 620, in whole or in part, during execution by the processor circuitry 610. The machine-readable instruction sets 638 may include machine-readable and/or processor-readable code, instructions, or similar logic capable of providing the synchronized media content presentation capabilities described herein.

A system user may provide, enter, or otherwise supply commands (e.g., selections, acknowledgements, confirmations, and similar) as well as information and/or data (e.g., subject identification information, color parameters) to the network connected platform 110 using one or more communicably coupled input devices 650. The one or more communicably coupled input devices 650 may be disposed local to or remote from the network connected platform 110. The input devices 650 may include one or more: text entry devices 651 (e.g., keyboard); pointing devices 652 (e.g., mouse, trackball, touchscreen); audio input devices 653; video input devices 654; and/or biometric input devices 655 (e.g., fingerprint scanner, facial recognition, iris print scanner, voice recognition circuitry). In embodiments, at least some of the one or more input devices 650 may include a wired or wireless interface that communicably couples the input device 650 to the network connected platform 110.

The network-connected platform 110 presents at least a portion of a media content presentation. Such media content presentations may include, without limitation: an audio presentation, a video presentation, or an audio/video presentation. In embodiments, the network connected platform 110 may form a small portion of a larger presentation, such as a portion of a video wall presentation. In embodiments, the network connected platform 110 may provide the entire presentation, for example an application where multiple output devices are all presenting a synchronized output.

The network connected platform 110 may be communicably coupled to one or more physical output devices 660. In at least some implementations, the one or more physical output devices 660 may include, but are not limited to, one or more: biometric output devices 661; visual output or display devices 662; tactile output devices 663; audio output devices 664, or combinations thereof. In embodiments, at least some of the one or more physical output devices 660 may include a wired or a wireless communicable coupling to the network connected platform 110.

For convenience, a network interface 120, the processor circuitry 610, the system memory 620, the one or more rotating media storage devices 630, the one or more solid-state storage devices 632, the one or more input devices 650, and the one or more output devices 660 are illustrated as communicatively coupled to each other via the communications link 516, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In some embodiments, all or a portion of the communications link 616 may be omitted and the components are coupled directly to each other using suitable wired or wireless connections.

Figure 7:
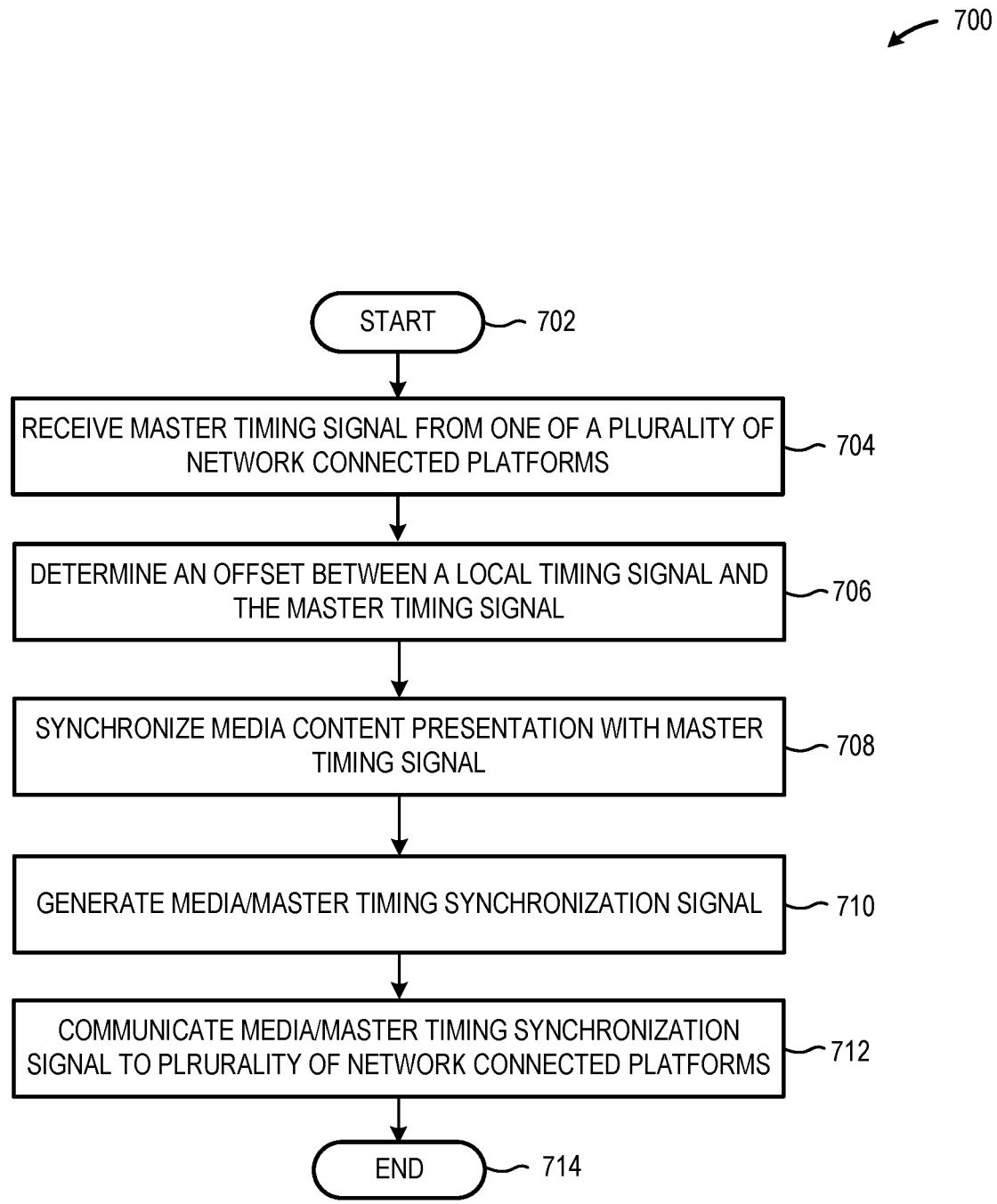
FIG. 7 is a high-level logic flow diagram of an illustrative method of using an IEEE 802.1AS timing signal broadcast across a network to cause a synchronized media presentation across a plurality of platforms communicably coupled to the network, in accordance with at least one embodiment described herein.

FIG. 7 is a high-level logic flow diagram of an illustrative method 700 of using an IEEE 802.1AS timing signal broadcast across a network 102 to cause a synchronized media presentation across a plurality of platforms communicably coupled to the network 102, in accordance with at least one embodiment described herein. In embodiments, one of the plurality of network connected platforms 110 is selected as an IEEE 802.1AS compliant grand master timekeeper. The selected grand master platform broadcasts a master timing signal 302 to the network connected platforms 110. Application service circuitry 124 in each of the network connected platforms determines a differential or offset 404 between the local platform time 402 and the master timing signal 302. Talker circuitry 126 disposed in one of the network connected platforms 110 synchronizes a start point of a media content presentation (e.g., a video presentation for a video wall that includes at least some of the network connected platforms 110) with the master timing signal 302. The talker circuitry 126 broadcasts a media/master timing synchronization signal to each of the network connected platforms 110. At the designated time, each of the network connected platforms 110 commences the media presentation at the designated start point. Beneficially, such systems and methods use existing hardware to support media content synchronization across the network connected platforms using the IEEE 802.1AS protocol—offering a significant advantage over systems using hardware-based multi-monitor synchronization solutions. Advantageously, the media content presentation may be initiated by interaction with only a single network connected platform to initialize the talker circuitry 126 which then autonomously causes the remaining network connected platforms to generate the synchronized media content presentation—offering a significant benefit over systems that require a user to initiate the media content presentation at two or more (or even all) network connected platforms. The method 700 commences at 702.

At 704, a first network connected platform 110A receives a master timing signal 302 from a second network connected platform 110B that includes master timing circuitry 122. In embodiments, an IEEE 802.1AS protocol may be used to select the second network connected platform 110B as a "Grand Master" timekeeper to generate the master timing signal 302. In other embodiments, other selection methods or procedures may be used to choose or otherwise designate a master timekeeper for the plurality of network connected platforms 110A-110n.

At 706, application service circuitry disposed in the first network connected platform 110A determines a differential or offset between a local timing signal 402 provided by a timekeeper local to the first network connected platform 110A and the master timing signal 302 provided by the second network connected platform 110B. Determining this offset permits the synchronization of the first network connected platform 110A to the master timing signal, thereby permitting the first network connected platform 110A to, in embodiments, independently synchronize a media content output to the master timing signal 302.

At 708, talker circuitry 126 disposed in the first network connected platform 110A synchronizes media content with the master timing signal 302. The talker circuitry 126 may synchronize a particular point in the media content with the master timing signal. For example, the talker circuitry 126 may synchronize the first frame of video media content with a defined time using the master timing signal 302.

At 710, the talker circuitry 126 generates a media/master timing signal synchronization signal 506 that includes information and/or data representative of the defined media start location and the defined media start time. Since each of the plurality of network connected platforms 110A-110n have been synched to the master timing signal at 706, the media content output from the plurality of network connected platforms 110A-110n will also be synchronized, thereby enabling coordinated or synchronized media presentations such as video walls (media output systems 150 coupled to each of the plurality of network connected platforms outputs a respective portion of the media presentation) and video barrages (media output systems 150 coupled to each of the plurality of network connected platforms outputs the same, synchronized, media presentation).

At 712, the talker circuitry 126 disposed in the first network connected platform 110A communicates the media/master timing signal synchronization signal 506 to each of the plurality of network connected platforms 110A-110n. The method 700 concludes at 714.

Figure 8:
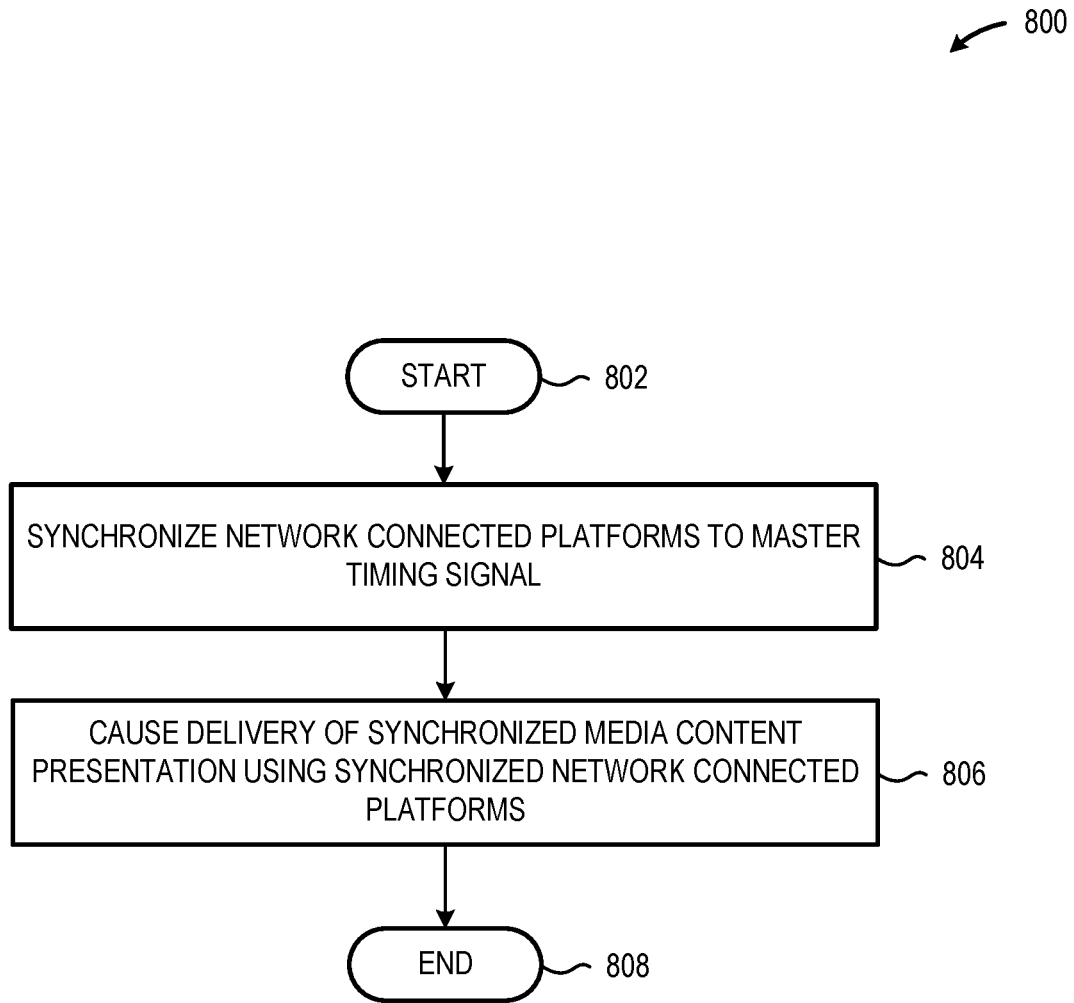
FIG. 8 is a high-level logic flow diagram of an illustrative method 800 of using an IEEE 802.1AS master timing signal broadcast across a network to cause a synchronized media presentation across a plurality of network connected platforms, in accordance with at least one embodiment described herein.

FIG. 8 is a high-level logic flow diagram of an illustrative method 800 of using an IEEE 802.1AS master timing signal broadcast across a network 102 to cause a synchronized media presentation across a plurality of network connected platforms 110A-110n, in accordance with at least one embodiment described herein. The method 800 may be used in conjunction with the method 700 discussed in FIG. 7. The method 800 commences at 802.

At 804, application service circuitry 124 disposed in each of the plurality of network connected platforms 110A-110n synchronizes the respective network connected platform 110 to the master timing signal. In embodiments, the application service circuitry in each of the plurality of network connected platforms 110A-110n determines a differential or offset between a local timing signal produced by a timekeeper resident in the respective network connected platform 110 and the master timing signal. This offset or differential may be stored in a transitory or non-transitory memory location within the respective network connected platform 110.

At 806, the talker circuitry 126 in the first network connected platform 110 generates a media/master timing signal synchronization signal 506 that includes information and/or data representative of the defined media start location and the defined media start time. The talker circuitry 126 disposed in the first network connected platform 110A then communicates the media/master timing signal synchronization signal 506 to each of the plurality of network connected platforms 110A-110n. Upon receipt of the media/master timing signal synchronization signal 506, each of the plurality of network connected platforms 110A-110n autonomously outputs the media content presentation at the defined time referenced to the master timing signal. The method 800 concludes at 808.

While FIGS. 7 and 8 illustrate various operations according to one or more embodiments, it is to be understood that not all of the operations depicted in FIGS. 7 and 8 are necessary for other embodiments. Indeed, it is fully contemplated herein that in other embodiments of the present disclosure, the operations depicted in FIGS. 7 and 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), rewritable compact disks (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods of presenting a synchronized media content presentation using a plurality of media output systems communicably coupled to a respective plurality of network connected platforms. A first network connected platform receives a master timing signal generated by master timing circuitry in a second network connected platform. Application service circuitry disposed in the first network connected platform determines an offset between a local timing signal and the receive master timing signal. Talker circuitry disposed in the first network connected platform synchronizes a media content presentation to the master timing signal and communicates a media/master timing signal synchronization signal to each of the network connected platforms. The media/master timing signal synchronization signal includes data representative of a media start location and a media start time referenced to the master timing signal.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for synchronizing a media content presentation across a plurality of network connected platforms using an IEEE 802.1AS master timing circuit and an IEEE 802.1AS application service circuit disposed in each of the network connected platforms.

According to example 1, there is provided a synchronized media delivery system. The system may include: a network communicably coupling each of a plurality of platforms to each of the other platforms included in the plurality of platforms; and a plurality of platforms, each of the platforms operably coupled to an output system and each of the plurality of platforms including a network interface that includes timing circuitry; wherein the network interface included in at least one platform includes master timing circuitry that generates a master timing signal and communicates the master timing signal to each of the other platforms included in the plurality of platforms; and wherein the network interface included in at least one platform includes application service circuitry that generates an output synchronization signal and communicates the output synchronization signal to each of the other platforms included in the plurality of platforms.

Example 2 may include elements of example 1 where the output synchronization signal comprises a signal generated using the master timing signal.

Example 3 may include elements of any of examples 1 or 2 where the network interface included in each of the plurality of platforms comprises an IEEE 802.3 ("Ethernet") compliant network interface.

Example 4 may include elements of any of examples 1 through 3 where the master timing circuitry comprises an IEEE 802.1AS compliant Grand Master.

Example 5 may include elements of any of examples 1 through 4 where the master timing signals comprises an IEEE 802.1AS compliant master timing signal.

Example 6 may include elements of any of examples 1 through 5 where the application service circuitry autonomously causes the synchronization at least a portion of the plurality of platforms.

Example 7 may include elements of any of examples 1 through 6 where the application service circuitry further autonomously causes the delivery of media output presentation on the synchronized portion of the plurality of platforms.

Example 8 may include elements of any of examples 1 through 7, and the system may further include a plurality of media output systems, each of the plurality of media output systems communicably coupled to a respective one of the plurality of platforms.

Example 9 may include elements of any of examples 1 through 8 where each of the plurality of media output systems comprises at least one display device.

Example 10 may include elements of any of examples 1 through 9 where each of the plurality of media output systems are disposed proximate at least one other of the plurality of media output systems.

Example 11 may include elements of any of examples 1 through 10 where the master timing circuitry and the application service circuitry are disposed in a single network interface in one of the plurality of platforms.

Example 12 may include elements of any of examples 1 through 11 where the application service circuitry comprises timing circuitry and media presentation circuitry to: determine a value indicative of a timing offset from the master timing signal; and synchronize the media presentation with the master timing signal to provide the output synchronization signal.

According to example 13, there is provided a synchronized media delivery method. The delivery method may include: receiving, at each of a plurality of platforms, a master timing signal generated by master timing circuitry disposed in at least one of platforms; determining, by application service circuitry included in at least one of the platforms, an offset between a local timekeeper and the received master timing signal; synchronizing, by the application service circuitry, a media content presentation with the master timing signal; determining, by the application service circuitry, for each of a plurality of platforms a respective synchronization between a portion of the media content presentation and the master timing signal; generating, by the application service circuitry, a respective output synchronization signal that includes information indicative of the synchronization between the portion of the media content presentation and the master timing signal for each of the plurality of platforms; and communicating, by the application service circuitry, the respective output synchronization signal to each of the plurality of platforms.

Example 14 may include elements of example 13 where receiving a master timing signal generated by master timing circuitry disposed in at least one of platforms may include: receiving, at a network interface disposed in each of the plurality of platforms, the master timing signal generated by the master timing circuitry.

Example 15 may include elements of any of examples 13 or 14 where receiving, at a network interface disposed in each of the plurality of platforms, the master timing signal generated by the master timing circuitry may further include: receiving, via an IEEE 802.3 ("Ethernet") compliant network interface disposed in each of the plurality of platforms, the master timing signal generated by the master timing circuitry.

Example 16 may include elements of any of examples 13 through 15 where receiving, at each of a plurality of platforms, a master timing signal generated by master timing circuitry disposed in at least one of platforms may include: receiving, at each of a plurality of platforms, a master timing signal generated by master timing circuitry that includes an IEEE 802.1AS compliant Grand Master disposed in at least one of platforms.

Example 17 may include elements of any of examples 13 through 16 where receiving, at each of a plurality of platforms, a master timing signal generated by master timing circuitry disposed in at least one of platforms may include: receiving, at each of a plurality of platforms, an IEEE 802.1AS compliant master timing signal generated by master timing circuitry disposed in at least one of platforms.

Example 18 may include elements of any of examples 13 through 17, and the method may further include: autonomously causing, by the application service circuitry, a synchronization of at least a portion of the plurality of platforms.

Example 19 may include elements of any of examples 13 through 18, and the method may further include: autonomously causing the delivery of the media content presentation on the synchronized portion of the plurality of platforms.

Example 20 may include elements of any of examples 13 through 19, and the method may further include: causing, by the application service circuitry, each of the plurality of platforms to display a video media content presentation synchronized with the master timing signal.

Example 21 may include elements of any of examples 13 through 20 where causing, by the application service circuitry, each of the plurality of platforms to display a video media output presentation synchronized with the master timing signal may include: causing, by the application service circuitry, each of the plurality of platforms to display a video media content presentation synchronized with the master timing signal using a media output system communicably coupled to the respective platform.

Example 22 may include elements of any of examples 13 through 21 where causing each of the plurality of platforms to display a video media content presentation synchronized with the master timing signal using a media output system communicably coupled to the respective platform may include: causing, by the application service circuitry, each of the plurality of platforms to display a video media content presentation synchronized with the master timing signal using each of a plurality of physically adjacent media output systems, each of the plurality of physically adjacent media output systems communicably coupled to a respective one of the plurality of platforms.

Example 23 may include elements of any of examples 13 through 22 where determining for each of a plurality of platforms a respective synchronization between a portion of the media content and the master timing signal may include: determining, by the application service circuitry, for each of a plurality of platforms a respective synchronization that includes a value indicative of a timing offset between the master timing signal and a local timekeeper used by the respective platform; and generating the respective output synchronization signal that includes information indicative of the synchronization between the portion of the media content presentation and the master timing signal for each of the plurality of platforms.

According to example 24, there is provided a synchronized media delivery system. The system may include: means for receiving, at each of a plurality of platforms, a master timing signal generated by master timing circuitry disposed in at least one of platforms; means for determining an offset between a local timekeeper and the received master timing signal; means for synchronizing a media content presentation with the master timing signal; means for determining for each of a plurality of platforms a respective synchronization between a portion of the media content presentation and the master timing signal; means for generating a respective output synchronization signal that includes information indicative of the synchronization between the portion of the media content presentation and the master timing signal for each of the plurality of platforms; and means for communicating the respective output synchronization signal to each of the plurality of platforms.

Example 25 may include elements of example 24 where the means for receiving a master timing signal generated by master timing circuitry disposed in at least one of platforms may include: means for receiving, at each of the plurality of platforms, the master timing signal generated by the master timing circuitry.

Example 26 may include elements of any of examples 24 or 25 where the means for receiving, at each of the plurality of platforms, the master timing signal generated by the master timing circuitry may further include: means for receiving, via an IEEE 802.3 ("Ethernet") compliant network interface disposed in each of the plurality of platforms, the master timing signal generated by the master timing circuitry.

Example 27 may include elements of any of examples 24 through 26 where the means for receiving, at each of a plurality of platforms, a master timing signal generated by master timing circuitry disposed in at least one of platforms may include: means for receiving, at each of the plurality of platforms, a master timing signal generated by an IEEE 802.1AS compliant Grand Master timing circuitry disposed in at least one of platforms.

Example 28 may include elements of any of examples 24 through 27 where the means for receiving, at each of a plurality of platforms, a master timing signal generated by master timing circuitry disposed in at least one of platforms may include: means for receiving, at each of the plurality of platforms, an IEEE 802.1AS compliant master timing signal generated by master timing circuitry disposed in at least one of the plurality of platforms.

Example 29 may include elements of any of examples 24 through 28, and the system may include means for autonomously causing, by the application service circuitry, a synchronization of at least a portion of the plurality of platforms.

Example 30 may include elements of any of examples 24 through 29, and the system may further include means for autonomously causing, by the application service circuitry, the delivery of the media content presentation on the synchronized portion of the plurality of platforms.

Example 31 may include elements of any of examples 24 through 30, and the system may further include means for causing each of the plurality of platforms to display a video media content presentation synchronized with the master timing signal.

Example 32 may include elements of any of examples 24 through 31 where the means for causing each of the plurality of platforms to display a video media output presentation synchronized with the master timing signal may include: means for causing each of the plurality of platforms to display a video media content presentation synchronized with the master timing signal using a media output system communicably coupled to the respective platform.

Example 33 may include elements of any of examples 24 through 32 where the means for causing each of the plurality of platforms to display a video media content presentation synchronized with the master timing signal using a media output system communicably coupled to the respective platform may include: means for causing each of the plurality of platforms to display a video media content presentation synchronized with the master timing signal using each of a plurality of physically adjacent media output systems, each of the plurality of physically adjacent media output systems communicably coupled to a respective one of the plurality of platforms.

Example 34 may include elements of any of examples 24 through 33 where the means for determining for each of a plurality of platforms a respective synchronization between a portion of the media content and the master timing signal may include: means for determining, for each of a plurality of platforms, a respective synchronization that includes a value indicative of a timing offset between the master timing signal and a local timekeeper used by the respective platform; and means for generating the respective output synchronization signal that includes information indicative of the synchronization between the portion of the media content presentation and the master timing signal for each of the plurality of platforms.

According to example 35, there is provided a non-transitory machine-readable storage medium. The non-transitory machine-readable storage medium includes instructions that when executed by application service circuitry, cause the application service circuitry to: determine an offset between a local timekeeper and a master timing signal generated by master timing circuitry disposed in at least one of a plurality of platforms; synchronize a media content presentation with the master timing signal; determine for each of the plurality of platforms a respective synchronization between a portion of the media content presentation and the master timing signal; generate a respective output synchronization signal that includes information indicative of the synchronization between the portion of the media content presentation and the master timing signal for each of the plurality of platforms; and communicate the respective output synchronization signal to each of the plurality of platforms.

Example 36 may include elements of claim 35 where the instructions that cause the circuitry to receive a master timing signal generated by master timing circuitry disposed in at least one of platforms may further cause the circuitry to: receive, at a network interface disposed in each of the plurality of platforms, the master timing signal generated by the master timing circuitry.

Example 37 may include elements of any of claim 35 or 36 where the instructions that cause the circuitry to receive, at a network interface disposed in each of the plurality of platforms, the master timing signal generated by the master timing circuitry may further cause the circuitry to: receive, via an IEEE 802.3 ("Ethernet") compliant network interface disposed in each of the plurality of platforms, the master timing signal generated by the master timing circuitry.

Example 38 may include elements of any of examples 35 through 37 where the instructions that cause the circuitry to receive, at each of a plurality of platforms, a master timing signal generated by master timing circuitry disposed in at least one of platforms may further cause the circuitry to: receive, at each of a plurality of platforms, a master timing signal generated by master timing circuitry that includes an IEEE 802.1AS compliant Grand Master disposed in at least one of platforms.

Example 39 may include elements of any of examples 35 through 38 where the instructions that cause the circuitry to receive, at each of a plurality of platforms, a master timing signal generated by master timing circuitry disposed in at least one of platforms may further cause the circuitry to: receive, at each of a plurality of platforms, an IEEE 802.1AS compliant master timing signal generated by master timing circuitry disposed in at least one of platforms.

Example 40 may include elements of any of examples 35 through 39 where the instructions may further cause the circuitry to: autonomously cause a synchronization of at least a portion of the plurality of platforms.

Example 41 may include elements of any of examples 35 through 40 where the instructions may further cause the circuitry to: autonomously cause the delivery of the media content presentation on the synchronized portion of the plurality of platforms.

Example 42 may include elements of any of examples 35 through 41 where the instructions may further cause the circuitry to: cause each of the plurality of platforms to display a video media content presentation synchronized with the master timing signal.

Example 43 may include elements of any of examples 35 through 42 where the instructions that cause the circuitry to cause each of the plurality of platforms to display a video media output presentation synchronized with the master timing signal may further cause the circuitry to: cause each of the plurality of platforms to display a video media content presentation synchronized with the master timing signal using a media output system communicably coupled to the respective platform.

Example 44 may include elements of any of examples 35 through 43 where the instructions that cause the circuitry to cause each of the plurality of platforms to display a video media content presentation synchronized with the master timing signal using a media output system communicably coupled to the respective platform may further cause the circuitry to: cause each of the plurality of platforms to display a video media content presentation synchronized with the master timing signal using each of a plurality of physically adjacent media output systems, each of the plurality of physically adjacent media output systems communicably coupled to a respective one of the plurality of platforms.

Example 45 may include elements of any of examples 35 through 44 where the instructions that cause the circuitry to determine for each of a plurality of platforms a respective synchronization between a portion of the media content and the master timing signal may further cause the circuitry to: determine, for each of a plurality of platforms, a respective synchronization that includes a value indicative of a timing offset between the master timing signal and a local timekeeper associated with the respective platform; and generate the respective output synchronization signal that includes information indicative of the synchronization between the portion of the media content presentation and the master timing signal for each of the plurality of platforms.

According to example 46, there is provided system to synchronize output on a plurality of devices, the system being arranged to perform the method of any of examples 13 through 23.

According to example 47, there is provided a chipset arranged to perform the method of any of examples 13 through 23.

According to example 48, there is provided a non-transitory machine readable medium comprising a plurality of instructions that, when executed by a computing device, cause the computing device to carry out the method according to any of examples 13 through 23.

According to example 49, there is provided a device configured to synchronize output on a plurality of devices, the device being arranged to perform the method of any of examples 13 through 23.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A synchronized media delivery system, comprising:
 a first media delivery platform including a first media output system to provide a media presentation, the first media delivery platform including:
  network interface circuitry to bidirectionally communicate via a communicatively coupled network;
  first timing circuitry to generate a master timing signal and communicate the master timing signal to one or more other media delivery platforms via the communicatively coupled network;
 a second media delivery platform including a second media output system to provide the media presentation, the second platform including:
  second local timing circuitry to provide a second local timing signal;
  application service circuitry to receive the master timing signal and determine a temporal offset between the master timing signal and the second local timing signal; and
  talker circuitry to:
   synchronize a defined location in the media presentation with a defined time in the master timing signal; and
   broadcast, via the network, a synchronization signal that includes:
    data representative of the defined location in the media presentation; and
    data representative of the defined master time;
 a third media delivery platform including a third media output system to provide the media presentation, the third media delivery platform including:
  third local timing circuitry to generate a third local timing signal;
  application service circuitry to:
   responsive to receipt of the synchronization signal:
    determine a temporal offset between the master timing signal and the third local timing signal; and
    deliver, at the defined master time, the media presentation commencing at the defined location in the media presentation using the third local timing signal.

2. The synchronized media delivery system of claim 1 wherein the synchronization signal comprises a signal generated using the master timing signal.

3. The synchronized media delivery system of claim 1 wherein the network interface circuitry comprises an IEEE 802.3 ("Ethernet") compliant network interface.

4. The synchronized media delivery system of claim 3 wherein the first timing circuitry comprises IEEE 802.1AS compliant Grand Master timing circuitry.

5. The synchronized media delivery system of claim 4 wherein the IEEE 802.1AS compliant Grand Master timing circuitry generates an IEEE 802.1AS compliant master timing signal.

6. The synchronized media delivery system of claim 1 wherein the application service circuitry autonomously causes a synchronization of media content to be displayed on a display associated with the media delivery system and the second display device.

7. A synchronized media delivery method, comprising:
 receiving, by application service circuitry in a media delivery platform, a master timing signal and a locally generated second local time signal indicative of a local time of the second media delivery platform;
 determining, by the application service circuitry in the media delivery platform, a temporal offset between the received master timing signal and the local timing signal;
 determining, by the application service circuitry in the media delivery platform, a temporal offset between the local timing signal and the master timing signal;
 synchronizing, by talker circuitry in the media delivery platform, a defined location in a media presentation with a defined time in the master timing signal;
 delivering, by a media output system included in the media delivery platform, at the defined master time, the media presentation commencing at the defined location in the media presentation using the local timing signal and the determined temporal offset; and
 broadcasting, by the media delivery platform to each of one or more other media delivery platforms, a synchronization signal that includes:
  data representative of the defined location in the media presentation; and
  data representative of the defined master time.

8. The method of claim 7 wherein the synchronization signal comprises a signal generated using the master timing signal.

9. The method of claim 7 wherein receiving the master timing signal generated by the first timing circuitry further comprises:
 receiving the master timing signal generated by the first timing circuitry, via an IEEE 802.3 ("Ethernet") compliant network interface.

10. The method of claim 7 receiving the master timing signal generated by first timing circuitry comprises:
 receiving a master timing signal generated by IEEE 802.1AS compliant Grand Master timing circuitry.

11. The method of claim 7, further comprising:
 synchronizing media content to be displayed on the first media output system included in the first media delivery platform with media content to be displayed on a second media output system included in the second media delivery platform and with media content to be displayed on the third media output system.

12. A non-transitory machine-readable storage medium that includes processor-executable instructions that, when executed by processor circuitry disposed in a media delivery platform, cause the processor circuitry to:
   cause a reception, by the media delivery platform, of a master timing signal and a locally generated local timing signal associated with the media delivery platform;
   determine a temporal offset between the received master timing signal and the local timing signal;
   synchronize a defined location in the media presentation with a defined time in the master timing signal;
   deliver, at the defined master time, the media presentation commencing at the defined location in the media presentation using the local timing signal and the determined temporal offset; and
   broadcast a synchronization signal that includes:
      data representative of the defined location in the media presentation; and
      data representative of the defined master times.

13. The non-transitory machine-readable storage medium of claim 12 wherein the synchronization signal comprises a signal generated using the master using the master timing signal.

14. The non-transitory machine-readable storage medium of claim 12 wherein the processor-executable instructions that cause the processor circuitry to cause the reception of the master timing signal further causes the processor circuitry to:
   cause the reception of the master timing signal generated by the timing circuitry, via an IEEE 802.3 ("Ethernet") compliant network interface disposed in another network connected media delivery platform.

15. The non-transitory machine-readable storage medium of claim 12 wherein the processor-executable instructions that cause the processor circuitry to cause the reception of the master timing signal further causes the processor circuitry to:
   cause the reception of the master timing signal generated by IEEE 802.1AS compliant Grand Master timing circuitry disposed in another network connected media delivery platform.

16. The non-transitory machine-readable storage medium of claim wherein the processor-executable instructions further cause the processor circuitry to:
   synchronize media content to be displayed on a display associated with the media delivery system using the local timing signal and the determined temporal offset.

* * * * *

UNITED STATES PATENT AND TRADEMARK OFFICE
CERTIFICATE OF CORRECTION

PATENT NO. : 10,931,989 B2
APPLICATION NO. : 15/829612
DATED : February 23, 2021
INVENTOR(S) : Ghangam et al.

Page 1 of 1

It is certified that error appears in the above-identified patent and that said Letters Patent is hereby corrected as shown below:

In the Claims

In Column 23, Line 23, in Claim 12, delete "times." and insert --time.-- therefor In Column 24, Line 21, in Claim 16, after "claim", insert --12--

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*